United States Patent [19]

Sekella et al.

[11] Patent Number: 4,569,426
[45] Date of Patent: Feb. 11, 1986

[54] CLUTCH AND BRAKE ASSEMBLY

[75] Inventors: Thomas C. Sekella, Elmira; Kenneth F. Seager, Sr., Horseheads, both of N.Y.

[73] Assignee: Facet Enterprises, Incorporated, Tulsa, Okla.

[21] Appl. No.: 469,341

[22] Filed: Feb. 24, 1983

[51] Int. Cl.[4] .................. F16D 67/06; F16D 11/00; F16D 27/10
[52] U.S. Cl. ........................ 192/18 B; 192/67 R; 192/84 C; 192/90; 192/108
[58] Field of Search ............... 192/18 B, 12 D, 90, 192/67 R, 108, 48.2, 48.5, 84 B, 84 C

[56] References Cited

U.S. PATENT DOCUMENTS

| | | | |
|---|---|---|---|
| 1,009,990 | 11/1911 | Norton | 192/67 R |
| 2,366,461 | 1/1945 | Shoreys | 192/67 R X |
| 3,173,525 | 3/1965 | Hergert | 192/18 B X |
| 3,175,665 | 3/1965 | Albrecht | 192/48.2 X |
| 3,331,481 | 7/1967 | Wrensch | 192/90 |
| 3,438,471 | 4/1969 | Wrensch | 192/18 B |
| 3,446,322 | 5/1969 | Wrensch | 192/18 B |
| 3,978,948 | 9/1976 | Baer | 192/18 B |

FOREIGN PATENT DOCUMENTS

| | | | |
|---|---|---|---|
| 920422 | 11/1954 | Fed. Rep. of Germany | 192/18 B |
| 1020695 | 2/1953 | France | 192/108 |
| 2303992 | 10/1976 | France | 192/18 B |

Primary Examiner—Rodney H. Bonck
Attorney, Agent, or Firm—Remy J. VanOphem

[57] ABSTRACT

A clutch assembly for mounting to a rotatable element adjacent to a non-rotatable element. The clutch assembly has a first clutch member capable of being mounted to the rotatable element, a clutch body capable of being mounted to the rotatable element adjacent to the first clutch member, and a second clutch member axially movably interconnected with the clutch body. The first and second clutch members are normally biased into engagement. A brake is interposed the non-rotating element and the clutch body. The brake is automatically operable to inhibit rotation of the clutch body upon selective disengagement of the first and second clutch members.

30 Claims, 5 Drawing Figures

CLUTCH AND BRAKE ASSEMBLY

BACKGROUND OF THE INVENTION

The present invention is directed to clutch and brake assemblies and, more particularly, to clutch and brake assemblies having a clutch which is engaged during normal operation and brake which is disengaged during normal operation and further wherein the clutch is selectively disengageable and wherein the brake is automatically engageable the said clutch disengages.

Many common mechanical apparatus use clutches to selectively drive devices. In many of these mechanical apparatus, the driven device is driven during most of the time that the driving shaft is rotating. It is, therefore, advantageous, under these circumstances, to provide a clutch assembly having a clutch which is normally engaged and which is driven from engagement during the period of time that disengagement is desired. Many such clutches have been developed in the past and are well known in the art.

For many applications, however, these clutches must be coupled with a brake to prevent the inadvertent motion of the driven device when the clutch is disengaged. The undesired motion of the driven device is caused by friction between the drive shaft and the element, such as a pulley or a gear, interconnecting the driven element and the clutch mechanism. Alternatively, some motion may be caused by vibrations. Furthermore, if the driven element was driven prior to the disengagement of the clutch assembly, inertia may keep the driven element in motion for an undesired additional period of time.

A first example of an apparatus requiring a brake and clutch assembly is a print mechanism using a single drive shaft to advance a print head along a line of type and to separately advance a set of ink wheels along the line of type in a fixed relationship with the print head. In this apparatus, during normal operation, escapement of the print head is caused by a motor driving the drive shaft to rotate a predetermined angular amount. A clutch mechanism between the shaft and the print head, which is normally engaged, permits the rotation motion of the shaft to be transferred, by means of a belt or a wire tape, to the print head. A pulley rigidly interconnected with the shaft also drives a belt or wire tape interconnected with the color wheel assembly so as to advance the color wheel assembly along the line of type together with the print head.

The color wheel assembly, however, may consist of several color wheels each having a different color of ink. Rapid selection between the color wheels is desired so as to produce a high speed multi-colored output. Selection of a different color wheel is obtained by disengaging the above mentioned clutch and driving the drive shaft to rotate a predetermined angular amount so as to advance the color wheel assembly relative to the print head and, therefore, to align the print head with a different color wheel. Once the color wheel has been selected, the print head and the color wheel may be advanced along the line of type together by re-engagement of the clutch.

Clearly, in this apparatus, it is undesirable to have the print head move during the ink wheel selection process. Therefore, a brake is needed to prevent the motion of the print head during this period of time. To solve this problem, it had been proposed to provide a separate brake mechanism between the print head assembly and the frame of the printing apparatus. For example, a brake assembly may be mounted on the drive shaft and fixed against rotation by interconnection with the frame of the apparatus. Since the printing apparatus is electronically controlled, it is most convenient to use electromechanically actuated clutches and brakes. Therefore, the device would require two electromagnetic coils to actuate the brake and the clutch. These separate brake and clutch elements would use a large amount of valuable space and would generate a substantial amount of heat when actuated.

Print mechanisms are becoming smaller and smaller and greater demands, in terms of speed and in terms of flexibility, are being made on print mechanisms daily particularly due to the advent of microprocessors and large frame computers. It is, therefore, likely that additional selection features, such as the ink wheel selection feature described above, become common place in these printers. For example, selection of various fonts may occur in this manner. A clutch brake assembly, taking less space, consuming less power, and generating less heat than the above described separate clutch and brake elements is needed for this purpose.

A second apparatus requiring a normally engaged clutch and a normally disengaged brake is an air conditioning fan apparatus. When an air conditioner is started, it is advantageous to permit the Freon in the cooling circuit to begin flowing in the compressor to begin operation prior to drawing any air through the system. Therefore, during this period of time it is preferable that the fan not operate. Since this period of time represents a small fraction of the time during which the drive shaft will be rotating, a normally engaged clutch is used and the clutch is selectively disengaged during the start-up period of each cooling cycle.

During the start-up period, the fan may rotate at a slow angular speed due to vibrations and due to friction. It has been determined that this small amount of rotation is detrimental to the efficient operation of the air conditioning apparatus. Therefore, to avoid this problem, selectively closeable louvers are used to prevent the flow of air through the apparatus during the start-up period. Alternatively, a brake element may be used to inhibit this inadvertent rotation of the fan blades.

For this apparatus, it would be advantageous to have a single clutch and brake element which is easily manufactured and installed. It would be advantageous if such a clutch and brake element would consume a small amount of power during the start-up period of each air conditioning cycle and consume no power during the remainder of the cycle. It would further be advantageous if this element were compact.

What is needed, therefore, is a clutch and brake assembly having a clutch which is normally engaged and a brake which is normally disengaged which consumes no power and generates no heat during normal operation. Further, such a clutch and brake assembly should operate using a small amount of energy to selectively disengage the clutch and simultaneously engage the brake when required.

SUMMARY OF THE INVENTION

The present invention provides a clutch and brake assembly having a normally engaged clutch and a normally disengaged brake. The clutch may be selectively disengaged and the brake simultaneously engaged when required.

In particular, the present invention provides a clutch and brake assembly for mounting to a rotatable element, such as a shaft, located adjacent to a non-rotatable element, such as a frame or housing of the mechanism. The clutch and brake assembly includes a first clutch member capable of being mounted to the rotatable element adjacent to the first clutch member and a second clutch member axially movably interconnected with the clutch body. First biasing means, such as a spring, bias the second clutch member into engagement with the first clutch member. A brake is provided between the clutch body and the non-rotating element to inhibit rotation of the clutch body when engaged. The second biasing means, such as an electomagnetic coil, is provided to selectively disengage the clutch members and engage the brake.

In one embodiment, the clutch members are selectively indexable relative to each other. One of the clutch members has a predetermined numbers of detents, each spaced a predetermined amount away from adjacent detents. The other clutch member has at least one detent cooperating with the detents in the first mentioned clutch member to permit engagement of the clutch members in one of a predetermined number of angular positions. The clutch assembly may further be provided with stop means between the first and second clutch members prohibiting relative rotation therebetween beyond a predetermined angular range. In another embodiment of the present invention, each clutch member has a frictional surface for engagement with the other clutch member. In this embodiment, the clutch members may be engaged in any relative angular position.

The primary object of the present invention, therefore, is to provide a unitary clutch and brake assembly.

Another object of the present invention is to provide a clutch and brake assembly having a normally engaged clutch and a normally disengaged brake which is operated by a single actuation means to selectively disengage the clutch and engage the brake. Preferably, the clutch is biased into engagement by a spring. Preferably, the clutch is disengaged and the brake is engaged by actuation of a single electromagnetic coil.

Still another object of the present invention is to provide a clutch and brake assembly having an indexing clutch subassembly which is normally in engagement and a brake assembly which is disengaged during normal operation. The clutch is selectively disengageable for indexing one clutch member relative to another clutch member. The brake is automatically engageable upon disengagement of the clutch.

Another object of the present invention is to provide a compact, inexpensive and energy efficient clutch and brake assembly. This is accomplished by providing a clutch and brake assembly consuming no power during normal operation and having a single electromagnetic coil for operation of both the clutch subassembly and the brake subassembly when required.

Still yet another object of the present invention is to provide a clutch and brake assembly for positively driving a driven element during normal operation and for positively stopping the driven element when required. This object is accomplished by providing a clutch and brake assembly having a clutch engageable for driving the driven element and a brake engageable for stopping the driven element and by providing a common means for operation of the clutch and brake.

These and many other objects and advantages of the present invention will become apparent to those skilled in the art when the following detailed description of the preferred embodiment is read in conjunction with the drawings appended hereto.

BRIEF DESCRIPTION OF THE DRAWINGS

In the attached drawings, similar reference numerals refer to similar elements throughout.

DETAILED DESCRIPTION OF THE PREFERRED EMBODIMENT

Referring now to the drawings, two examples of clutch and brake assemblies according to the present invention are illustrated. Each of these clutch assemblies incorporates the primary objects and advantages of the present invention but are designed to meet specific needs. It will be apparent to one skilled in the art that both of these brake and clutch assemblies may be used for other purposes other than those for which they are specifically designed. It will also be apparent to one skilled in the art that other clutch assemblies may be designed in accordance with the teachings of the present invention and within the scope of the claims appended hereto for other purposes.

Figure 1:
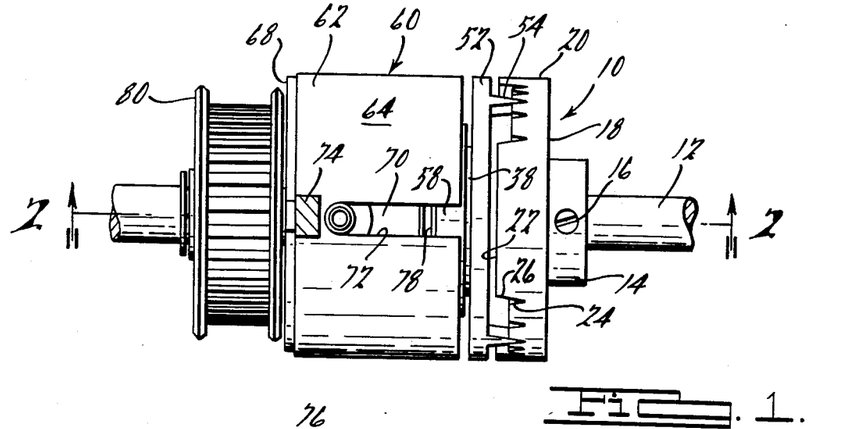
FIG. 1 is a top plan view of a first example of a clutch and brake assembly according to the present invention.
Figure 2:
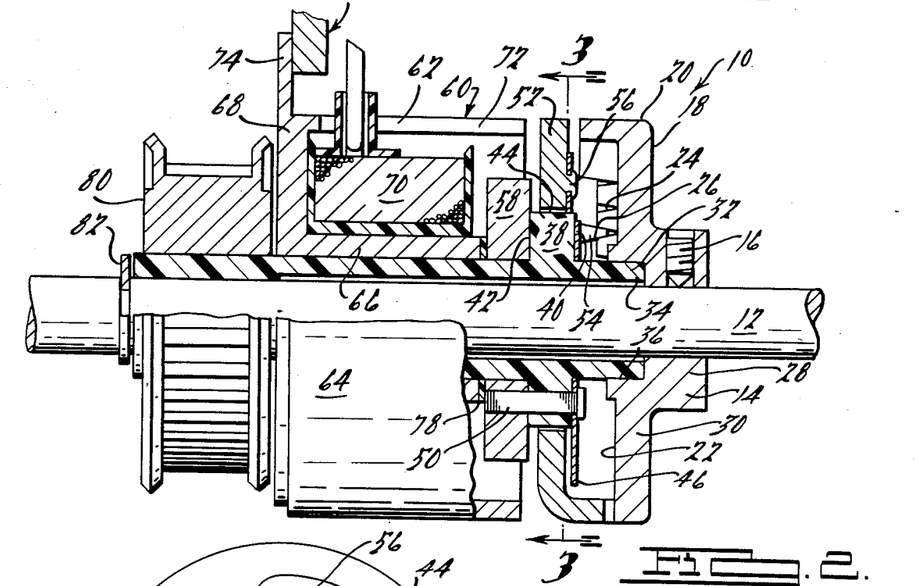
FIG. 2 is a partially cross-sectional view taken along line 2—2 of FIG. 1.
Figure 3:
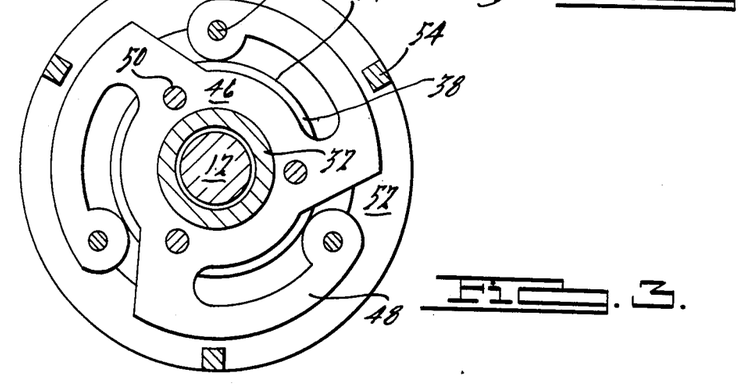
FIG. 3 is a cross-sectional view taken along line 3—3 of FIG. 2.

Referring now to FIGS. 1 through 3, there is shown a clutch and brake assembly 10 for use with a printing mechanism or a similar device requiring an indexing clutch.

The print mechanism for which the clutch and brake assembly 10 is designed is not illustrated in the drawing. The print mechanism includes a housing, a stepping motor, and a drive shaft, shown in the drawing as drive shaft 12. The drive shaft extends between the front and back of the printing mechanism. An ink supply assembly, for example a series of spaced apart ink wheels mounted on a single shaft, is driven across a line of type by the drive shaft 12 when the shaft is rotated by the stepping motor. Similarly, a print head is movable along the line of type by the rotation of the drive shaft 12. The clutch and brake assembly 10 of the present invention, however, is interposed the drive shaft 12 and the print head so as to permit selective disengagement of the print head from the drive shaft 12. During this period of selective disengagement of the print head, the ink wheels may be moved relative to the print head so that a different colored ink may be used during the printing process. The suitability of the clutch and brake assembly 10 for this purpose will be appreciated by one skilled in the art upon reading the following detailed description of the clutch and brake assembly 10.

As shown in FIG. 2, the clutch and brake assembly is provided with a drive hub 14. The drive hub is rotatably mounted to the drive shaft 12 and is then secured against rotation relative to the shaft by means of one or more setscrews 16. The drive hub forms one end of the clutch and brake assembly and is, therefore, provided with a suitable external surface finish for aesthetic purposes on one external face 18 and its peripheral cylindrical surface 20.

The drive hub 14 further acts as a first clutch member for the clutch and brake assembly 10. The drive hub is, therefore, provided with clutch means on the face 22 opposite the external face 18. In the example illustrated, the clutch means on the face 22 consists of a plurality of detents 24, each spaced a predetermined distance from adjacent detents. As used herein, the term "detents" may refer to slots or other indentations or may refer to teeth or similar protrusions. In the example illustrated, the detents 24 in the drive hub 14 are slots spaced 13.8° apart. Three groups of six detents are provided around the face 22. Each of these groups of detents are spaced 120° apart from center to center. Abutments 26 are provided between each adjacent group of detents. The abutments, in a manner to be described shortly, limit the relative angular displacement of elements of the clutch and brake assembly relative to each other.

The drive hub may be made of a plastic material or, alternatively, a metallic material as dictated by design criteria well known in the art. In one example of structure, the drive hub is formed of a metallic cylindrical outer hub portion 28 and a plastic clutch portion 30. This type of construction permits the clutch portion to be inexpensively manufactured by injection molding, or similar process, yet provides the drive hub with additional strength.

A drive sleeve 32 is rotatably mounted to the drive shaft 12 with an end of the drive sleeve 32 adjacent to the face 22 of the drive hub 14. The drive sleeve 32 is a generally cylindrical member formed of a non-metallic material. An end 34 of the drive sleeve 32 which is adjacent to the face 22 of the drive hub 14 is inserted into a partial bore 36 in the center of the drive hub 14 and is rotatable therein. The drive sleeve 32 is provided with an annular shoulder 38 spaced a predetermined distance from the drive hub 14. The annular shoulder 38 has an annular surface 40 facing the drive hub 14, an annular surface 42 facing away from the drive hub, and a cylindrical surface 44 therebetween.

A flat spring 46, best illustrated in FIG. 3, is mounted to the annular surface 40 of the drive sleeve 32. The spring 46 is mounted to the annular shoulder 38 by means of steel rivets 50. The rivets used preferably have a helix thread acting more like splines than threads to positively engage the plastic material of the drive sleeve. The spring 46 may be a sheet metal stamping of spring steel or similar material. The spring 46 has three spiraling fingers 48 forming a clockwise or counterclockwise pinwheel. Each of the fingers 48 extend beyond the outer diameter of the annular shoulder 38.

An armature 52 is movably mounted to the outer cylindrical surface 44 of the annular shoulder 38. The armature 52 is a thin disk-shaped element having a central aperture for the annular shoulder 38 of the drive sleeve and is formed of a ferromagnetic material so as to be reciprocable along the drive sleeve in response to a selectively operable magnetic coil. The armature 52 acts as a second clutch member and, therefore, is provided with at least one detent 54 for selective engagement with the detents 24 of the drive hub. In the example illustrated, three detents 54 are provided on the armature 52, each engaging one of the groups of detents on the drive hub 14. The armature may, therefore, be rotated relative to the drive hub when the armature is reciprocated away from the drive hub. Rotation of the armature relative to the drive hub is limited by the abutments 26 so that, in the example illustrated, the armature may only rotate 69° relative to the drive hub. The detents 54 in the armature, that is the teeth extending from the armature, may engage the slots in the drive hub in each of six relative angular positions.

The armature 52 is connected with the spring 46 by means of three rivets 56 extending through apertures near the ends of each respective finger 48 of the spring. If desired, and as illustrated, the rivets 56 may be formed with the armature as is well known in the art. The spring 46 thereby biases the armature 52 against the drive hub 14 and, therefore, biases the detents 54 and 24 into engagement.

An inner pole plate 58 is mounted to the drive sleeve 32 for rotation therewith adjacent to the annular surface 42 thereof. In the example illustrated, the inner pole plate is a washer formed of a low carbon steel but may be formed of any magnetically responsive material. Also in the example illustrated, the inner pole plate 58 is secured to the drive sleeve by means of the same rivets 50 securing the spring 46 to the annular shoulder 38.

An electromagnetic clutch body subassembly 60 is rotatably mounted to the drive sleeve 32 adjacent to the inner pole plate 58. The design of the electromagnetic subassembly 60 is well known in the art. It includes a magnet body 62 having an outer cylindrical wall 64, an inner cylindrical wall 66 and a flat face wall 68 extending therebetween. The magnet body further includes an electromagnetic coil 70 fitted between the cylindrical walls 64 and 66. A slot 72 is provided in the outer cylindrical wall for electrical connection of the electromagnetic coil 70. In the example illustrated, the magnet body 62 is further provided with an anti-rotational tab 74, also well known in the art, which may be interconnected with a non-rotating element, such as the housing of the mechanism using the clutch assembly. The mounting of the anti-rotational tab 74 is shown schematically at 76.

Brake means 78 are provided between the magnet body 62 and the drive sleeve 32. In the example illustrated, the brake means 78 consists of a frictional brake disposed between the inner pole plate 58 and the inner cylindrical wall 66 of the magnet body. The brake is located at a small diameter from the center of the longitudinal axis of the drive shaft 12 in comparison with the diameter of the clutch detents 24 and 54 for reasons that will be described later. The brake consists of a film of low friction material, such as Teflon, and may be five thousandths (0.005) thick.

A pulley 80 is mounted on the drive sleeve 32 adjacent to the flat face wall 68 of the magnet body 62. The pulley 80 is fixedly secured to the drive sleeve for rotation therewith. In the example illustrated, the pulley 80 is formed by a plastic material and is bonded to the drive sleeve either adhesively or, preferably, by ultrasonic methods. It should be noted that the pulley, therefore, together with the annular shoulder 38, secures the electromagnetic clutch body subassembly 60 and the friction brake 78 to the drive sleeve 32. Finally, a C-clip 82 is provided in a suitable annular recess in the drive shaft 12 for securing the drive sleeve in position.

Operation of the clutch and brake assembly may now be understood. During normal operation, that is, during operation when the electromagnetic coil 70 is not energized, the armature 52 is biased by the spring 46 into engagement with the drive hub 14. The drive sleeve 32 is bonded to the pulley 80, riveted to the inner pole plate 58 and interconnected by way of the spring 46 to the armature 52, but is free to rotate relative to the magnet body 62. The pulley 80 is bonded to the drive sleeve 32 in a manner such that the magnet body exerts no compression force on the frictional brake 78 during normal operation. Therefore, the brake will offer negligible resistance to the normal operation of the print head.

When the clutch is to be disengaged, the electromagnetic coil 70 is energized. Energizing the electromagnetic coil 70 has two direct effects. First, the energized coil acts upon the armature 52 to overcome the force of the spring 46 and, thereby, bias the clutch out of engagement. Furthermore, energizing the coil initiates an attraction force between the magnet body 62 and the inner pole plate 58 whereby the magnet body 62 and the inner pole plate 58 are biased against one another, thereby increasing the frictional force therebetween. A small amount of relative movement between the magnet body and the inner pole plate may occur, particularly if the friction brake 78 is compressed.

When the electromagnetic coil 70 is energized and the drive shaft 12 is driven, the drive hub 14 will rotate relative to the armature 52. The friction brake 78 will inhibit rotation of the drive sleeve 32 and all elements interconnected therewith. If, however, an attempt is made to rotate the drive hub 14 beyond the predetermined angular range corresponding, in the print mechanism described above, to displacing the ink wheel assembly relative to the print head to a position beyond the positions corresponding to the alignment of the print head with one of the ink wheels, the detent teeth 54 of the armature 52 will engage the abutments 26 of the drive hub and, therefore, prohibit further relative rotation. In this event, the drive hub will overcome the force of the friction brake 78 and drive the print head. It is for this reason that the detents 24 and 54 of the clutch members are located at a large diameter relative to the longitudinal axis of the drive shaft 12 and the friction brake 78 is located at a small diameter relative thereto. For use with the above described print mechanism, the clutch typically must provide a torque of thirty ounce inches minimum while the friction brake must provide a torque of four to seven ounce inches maximum. The use of the abutments to limit the angular rotation of the drive sleeve 32 relative to the drive hub 14 is particularly advantageous for use with this type of print mechanism because such print mechanisms are often automatically operated and, as a result of a power shut down the microprocessor controller may not always be aware of the ink wheel which was previously selected. Therefore, such a print mechanism may be designed to, as part of the start-up routine, drive the ink wheel assembly to one of its extreme positions relative to the print head and, thereafter, select the ink wheel desired.

Figures 4, 5:
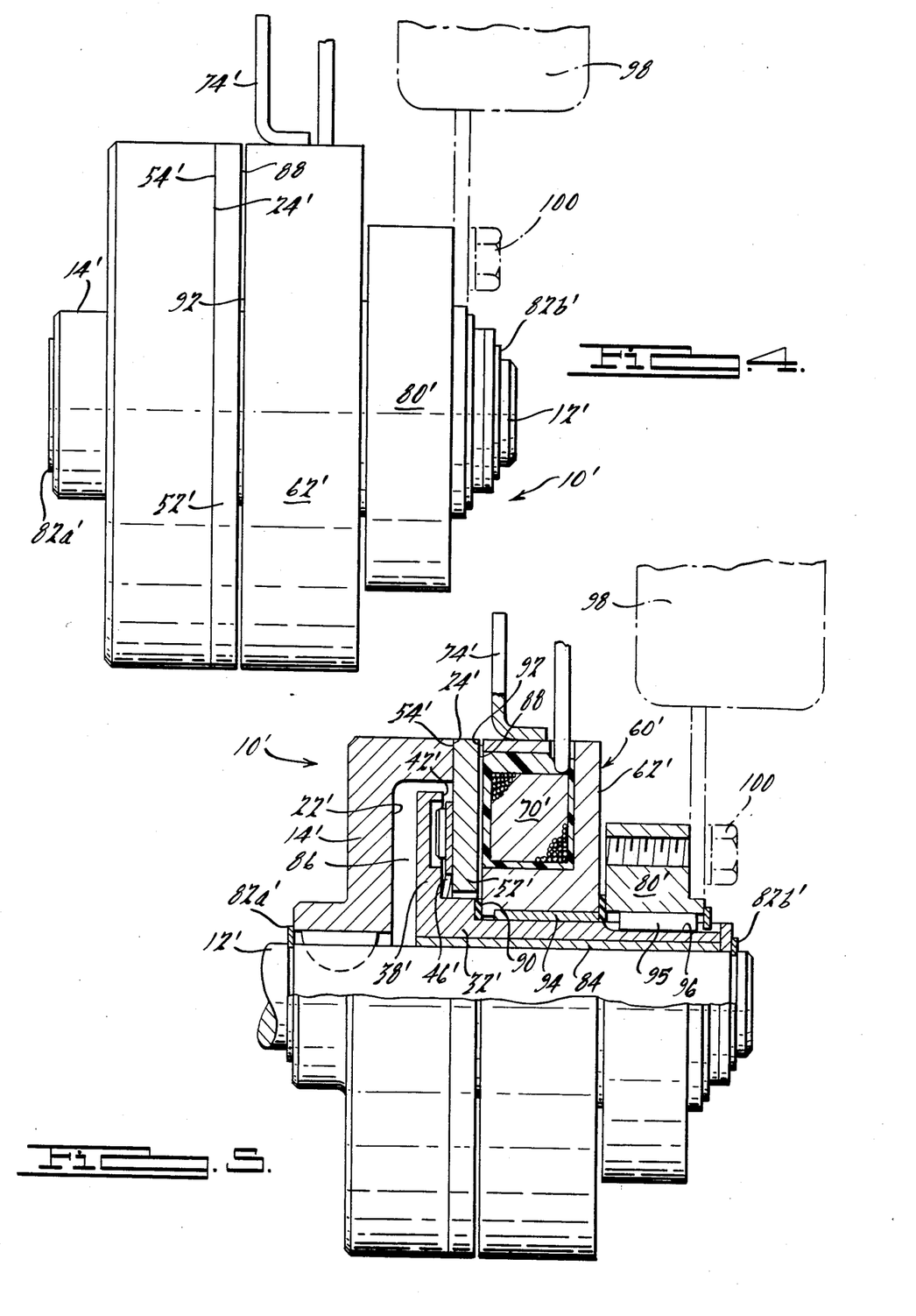
FIG. 4 is a top plan view of a second example of a clutch and brake assembly according to the present invention.
FIG. 5 is a top plan view similar to FIG. 4 but with parts cutaway.

FIGS. 4 and 5 illustrate a second example of a clutch and brake assembly 10' according to the present invention. The clutch and brake assembly 10' is designed for use on an air conditioning unit for selectively disengaging the cooling fan and for positively preventing the idling rotation of the cooling fan. The clutch and brake assembly 10' is mounted at the end of an input shaft 12'. A drive hub 14' is fixedly secured to the input shaft 12' by appropriate means. One face 22' of the drive hub 14' is provided with a friction clutch surface 24'. Detents are not used for the clutch and brake assembly 10' since there is no indexing requirement when the clutch is used for a cooling fan. A drive sleeve 32' is rotatably mounted on the input shaft 12'. In the example illustrated, the drive sleeve is metallic and is provided with bearings 84 to facilitate smooth rotation of the drive sleeve relative to the input shaft 12'. The drive sleeve 32', unlike the drive sleeve 32, is not directly interconnected with the drive hub 14'. Instead, the drive sleeve 32' is provided with an annular head or enlargement 38' generally disposed within a cavity 86 in the face 22' of the drive hub 14'.

A spring 46' similar to the spring 46 described above is mounted by appropriate means to an annular surface 42' of the head or enlargement 38' of the drive sleeve 32'. The annular surface 42' in the example illustrated in FIGS. 4 and 5 is the annular surface facing away from the drive hub 14'. An armature 52' is mounted to fingers on the spring 46' in a manner similar to the armature 52 described above. The armature 52' is an annular element having a clutch surface 54' engageable with the friction clutch surface 24' of the drive hub 14'. The armature 52' is further provided with a brake surface 88 opposite the clutch surface 54'.

An electromagnetic subassembly 60' is rotatably mounted to the drive sleeve 32' adjacent to the brake surface 88 of the armature 52'. In the example illustrated, an abutment 90 is provided between the magnet body 62' of the electromagnetic subassembly 60' and the drive sleeve 32' to provide a predetermined space between the brake surface 88 of the armature 52' and a cooperating brake surface 92 of the magnet body 62' when the armature is engaging the clutch surface 54' of the drive hub 14'. Bearings 94 may also be provided to facilitate rotation of the drive sleeve 32' relative to the magnet body 62'. An anti-rotational tab 74' is also provided to prevent the rotation of the magnet body 62' relative to the housing of the cooling fan. An output hub 80' is mounted to the drive sleeve 32' and is constrained to rotate therewith by means of a key 95 extending from the ouput hub 80' into a keyway 96 in the drive sleeve 32'. Fan blades 98 are interconnected with the output hub 80' by means of bolts 100. C-clips 82a' and 82b' are provided at either end of the clutch and brake assembly 10' to secure it in position along the input shaft 12'.

The operation of the clutch and brake assembly 10' may now be appreciated. During an initial start-up period, during a cooling cycle for an air conditioning unit, it is desired that the cooling fan be inoperative. The clutch and brake assembly 10' is actuated to prevent rotation of the cooling fan blades 98 by energizing the electromagnetic subassembly 60'. Energizing the electomagnetic coil 70' in the electromagnetic subassembly 60' biases the armature 52' against the force of the spring 46'. The electromagnetic force generated biases the armature against the magnet body 62' thereby engaging the brake surfaces 88 and 92 to prevent rotation of the cooling fan. When the electromagnetic coil 70' is de-energized, the spring 46' biases the armature away from the magnet body 62' and towards the drive hub 14'. The spring force is sufficient to cause the engagement of the frictions clutch surfaces 24' and 54' so that the cooling fan blades 98 are positively driven.

It may, therefore, be readily appreciated that the present invention provides, in either of the two examples of structure described above, a simple, inexpensive, energy efficient, and compact clutch and brake assembly for simultaneously actuating a brake and clutch by a single electromagnetic coil. It may be readily appreciated by those skilled in the art that other variations and modifications may be made to the present invention to adapt to specific purposes other than those described above. The clutch and brake assemblies described above require no expenditure of energy during normal operation and require the operation of only a single electromagnetic coil for a comparatively small period of time during the operation of the device using the brake.

Still further modifications, variations, and improvements will be apparent to one skilled in the art within the scope of the teachings of the present invention. Such modifications, variations and improvements are included within the scope of the patent application which is intended to be limited only by the claims appended hereto.

What is claimed as novel is as follows:

1. A clutch and brake assembly for mounting to a rotatable element adjacent to a non-rotatable element, said clutch and brake assembly comprising:
    a first clutch member capable of being mounted to said rotatable element;
    a clutch body rotatably interconnected with said first clutch member;
    a second clutch member axially movably interconnected with said clutch body;
    first biasing means biasing said second clutch member into engagement with said first clutch member;
    brake means interposed said non-rotatable element and said clutch body selectively engageable to inhibit rotation of said clutch body; and
    second biasing means selectively operable to disengage said second clutch member from said first clutch member and to engage said brake means;
    wherein each of said first and second clutch members further comprises interlocking indexing means selectively engageable in a plurality of predetermined relative angular positions of said first and second clutch members.

2. The clutch and brake assembly of claim 1 wherein one of said clutch members has a predetermined number of detents each spaced a predetermined angular amount away from adjacent detents and wherein the other of said clutch members has at least one detent cooperating with said detents in said one clutch member to permit engagement of said clutch members in said predetermined number of angular positions.

3. The clutch and brake assembly of claim 1 further comprising means interposed said first clutch member and second clutch member for prohibiting relative rotation therebetween beyond a predetermined angular range.

4. The clutch and brake assembly of claim 1 wherein said first biasing means comprises a spring interposed said clutch body and said second clutch member.

5. The clutch and brake assembly of claim 1 wherein said second biasing means comprises a selectively operable electromagnet, said brake means being actuatable in response to the operation of said electromagnet and said second clutch member being biased in response to said electromagnet away from engagement with said first clutch member.

6. A clutch and brake assembly for mounting to a rotatable element adjacent to a non-rotatable element, said clutch and brake assembly comprising:
    a first clutch member capable of being mounted to said rotatable element;
    a clutch body rotatably interconnected with said first clutch member;
    a second clutch member axially movably interconnected with said clutch body;
    first biasing means biasing said second clutch member into engagement with said first clutch member;
    brake means interposed said non-rotatable element and said clutch body selectively engageable to inhibit rotation of said clutch body; and
    second biasing means selectively operable to disengage said second clutch member from said first clutch member and to engage said brake means; and wherein said brake means further comprises:
        a brake body movably mounted with respect to said clutch body such that said brake body may translate between predetermined positions relative to said clutch body along the axial direction of said rotatable;
        means depending from said brake body and engageable with said non-rotatable element to prohibit rotation of said brake body; and
        a brake surface interposed said clutch body and said brake body automatically operable in response to movement of said brake body to one of said predetermined positions to inhibit rotation of said clutch body relative to said brake body.

7. The clutch and brake assembly of claim 6 wherein said second biasing means comprises a selectively operable electromagnet, said brake means being movable in response to said electromagnet into said one position and said second clutch member being biased in response to said electromagnet away from engagement with said first clutch member.

8. The clutch and brake assembly of claim 7 wherein said electromagnet comprises a coil of wire wound around a portion of said brake body.

9. A clutch and brake assembly for mounting on a rotatable shaft adjacent to a non-rotating element, said clutch and brake assembly comprising:
    a first clutch member capable of being fixedly mounted to said shaft for rotation therewith;
    a clutch body capable of being rotatably mounted to said shaft adjacent to said first clutch member;
    stop means interposed said clutch body and said shaft prohibiting the translation of said clutch body along said shaft relative to said first clutch member;
    a second clutch member movably interconnected with said clutch body such that said second clutch member is constrained to rotate with said clutch body but may translate along the longitudinal axis of said shaft relative to said clutch body towards and away from said first clutch member;
    selectively engageable interlocking clutch means interposed said first clutch member and said second clutch member, said clutch means prohibiting relative rotation between said first and second clutch members when said clutch members are engaged and permitting relative rotation therebetween when said clutch members are spaced apart a predetermined distance;
    first biasing means biasing said second clutch member against said first clutch member and, thereby, said clutch means into engagement;
    a brake body movably mounted to said clutch body such that said brake body may translate between predetermined positions relative to said clutch body along the axial direction of said shaft;
    means depending from said brake body and selectively engageable with said non-rotating element to prohibit rotation of said brake body;

a brake surface interposed said clutch body and said brake body automatically operable in response to movement of said brake body to one of said predetermined positions to inhibit rotation of said clutch body relative to said brake body; and second biasing means selectively operable to bias said brake body into said one of said predetermined positions and to bias said second clutch member away from engagement with said first clutch member.

10. The clutch and brake assembly of claim 9 wherein said clutch means comprises:

first indexing means on said first clutch member, and cooperating second indexing means on said second clutch member, said first and second indexing means being engageable with each other in a plurality of predetermined angular positions of said second clutch member relative to said first clutch member.

11. The clutch and brake assembly of claim 10 wherein said clutch means further comprises stop means prohibiting relative rotation between said first and second clutch members beyond a predetermined angular range.

12. The clutch and brake assembly of claim 11 wherein said first indexing means and said second indexing means comprise a plurality of selectively engageable detents on said first and second clutch members, respectively.

13. The clutch and brake assembly of claim 12 wherein one of said clutch members has six detents 13.8° apart each, wherein the other of said clutch members has at least one detent cooperating with said six detents and wherein said stop means prohibits relative rotation of said clutch members beyond the 69° angular range defined by engagement of said at least one detent with each of said six detents.

14. The clutch and brake assembly of claim 13 wherein said other of said clutch members further comprises three detents each located 120° away from the other detents and further wherein said one of said clutch members further comprises three groups of six detents, also each spaced 120° apart, each of said groups of detents being selectively engageble with one of said detents.

15. The clutch and brake assembly of claim 14 wherein said detents are disposed on adjacent surfaces of said first and second clutch members near the outer peripheral surfaces thereof.

16. The clutch and brake assembly of claim 10 wherein said first indexing means and said second indexing means comprise a plurality of selectively engageable detents on said first and second clutch members, respectively.

17. The clutch and brake assembly of claim 9 wherein said clutch means further comprises stop means prohibiting relative rotation between said first and second clutch members beyond a predetermined angular range.

18. The clutch and brake assembly of claim 17 wherein one of said clutch members has six detents 13.8° apart each, wherein the other of said clutch members has at least one detent cooperating with said six detents and wherein said stop means prohibits relative rotation of said clutch members beyond the 69° angular range defined by engagement of said at least one detent with each of said six detents.

19. The clutch and brake assembly of claim 10 wherein said detents are disposed on adjacent surfaces of said first and second clutch members near the outer peripheral surfaces thereof.

20. The clutch and brake assembly of claim 19 wherein said brake surface is disposed between adjacent annular surfaces of said clutch body and said brake body, said annular surfaces having an average diameter substantially less than the average diameter of said detents.

21. The clutch and brake assembly of claim 9 wherein said second biasing means comprises a selectively operable electromagnet, the translation said brake body being actuateable in response to the operation of said electromagnet and said second clutch member being biased in response to said electromagnet away from engagement with said first clutch member.

22. The clutch and brake assembly of claim 21 wherein said electromagnet comprises a coil of wire wound around a portion of said brake body.

23. A clutch and brake asembly for mounting on a rotatable shaft for selectively driving a driven element relative to a stationary element said clutch and brake assembly comprising:

a first clutch member capable of being fixedly mounted to said shaft for rotation therewith;

a clutch body capable of being rotatably mounted to said shaft adjacent to said first clutch member;

stop means interposed said clutch body and said shaft prohibiting translation of said clutch body relative to said first clutch member;

intermediate power transmission means interposed said clutch body and said driven element for transmitting power therebetween;

a second clutch member movably interconnected with said clutch body such that said second clutch member is constrained to rotate with said clutch body but may translate along the longitudinal axis of said shaft relative to said clutch body towards and away from said first clutch member;

selectively engageable interlocking clutch means interposed said first clutch member and said second clutch member, said interlocking clutch means being engageable with each other in a plurality of predetermined relative angular positions of said clutch members;

biasing means interposed said clutch body and said second clutch member biasing said clutch means into engagement;

brake means interposed said stationary element and said clutch body selectively engageable to inhibit rotation of said clutch body; and second biasing means selectively operable to disengage said clutch means and to engage said brake means.

24. The clutch and brake assembly of claim 23 wherein one of said clutch members has a predetermined number of detents each spaced a predetermined angular amount away from adjacent detents and wherein the other of said clutch members has at least one detent cooperating with said detents in said one clutch member to permit engagement of said clutch members in said predetermined number of angular positions.

25. The clutch and brake assembly of claim 23 wherein said brake means further comprises:

a brake body movably mounted to said clutch body such that said brake body many translate between predetermined positions relative to said clutch body along the axial direction of said shaft;

stop means depending from said brake body and engageable with said stationary element to prohibit rotation of said brake body; and a brake surface interposed said clutch body and said brake body automatically operable in response to movement of said brake body to one of said predetermined positions to inhibit rotation of said clutch body relative to said brake body.

26. The clutch and brake assembly of claim 25 wherein said second biasing means comprises a selectively operable electromagnet, said brake means being movable in response to said electromagnet into said one position and said second clutch member being biased in response to said electromagnet away from engagement with said first clutch member.

27. The clutch and brake assembly of claim 26 wherein said electromagnet comprises a coil of wire wound around a portion of said brake body.

28. The clutch and brake assembly of claim 23 wherein said clutch means further comprises stop means prohibiting relative rotation between said first and second clutch members beyond a predetermined angular range.

29. The clutch and brake assembly of claim 23 wherein said detents are disposed on adjacent surfaces of said first and second clutch members near the outer peripheral surfaces thereof.

30. The clutch and brake assembly of claim 23 wherein said biasing means comprises a spring interposed said second clutch member and said clutch body.

* * * * *

UNITED STATES PATENT AND TRADEMARK OFFICE
CERTIFICATE OF CORRECTION

PATENT NO.  : 4,569,426
DATED       : February 11, 1986
INVENTOR(S) : Thomas C. Sekella, et al.

It is certified that error appears in the above—identified patent and that said Letters Patent is hereby corrected as shown below:

Column 1, line 11, delete "the said" and insert ---- when the ----.

Column 1, line 43, delete "rotation" and insert ---- rotational ----.

Column 10, line 16, after "rotatable" insert ---- element ----.

Signed and Sealed this

Eighth Day of July 1986

[SEAL]

Attest:

DONALD J. QUIGG

Attesting Officer

Commissioner of Patents and Trademarks